(12) United States Patent
Ito

(10) Patent No.: US 6,256,578 B1
(45) Date of Patent: Jul. 3, 2001

(54) NAVIGATION SYSTEM AND NAVIGATION DATA PROCESSING METHOD

(75) Inventor: Toru Ito, Nagoya (JP)

(73) Assignee: Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 09/236,104

(22) Filed: Jan. 25, 1999

(30) Foreign Application Priority Data

Jan. 26, 1998 (JP) .................................................. 10-013036

(51) Int. Cl.$^7$ .................................................. G01C 21/00
(52) U.S. Cl. .......................... 701/200; 701/208; 340/990; 340/95; 707/104
(58) Field of Search .................................... 701/200, 202, 701/208, 209; 340/988, 990, 995; 73/178 R; 707/100, 104; 717/5; 709/219; 382/276

(56) References Cited

U.S. PATENT DOCUMENTS

| | | | |
|---|---|---|---|
| 5,968,109 | * 10/1999 | Israni et al. | 701/208 |
| 6,038,559 | * 3/2000 | Ashby et al. | 701/208 |
| 6,047,280 | * 4/2000 | Ashby et al. | 701/209 |
| 6,081,665 | * 6/2000 | Nilsen et al. | 717/5 |
| 6,083,353 | * 7/2000 | Alexander, Jr. | 382/276 |
| 6,094,677 | * 7/2000 | Carek et al. | 709/276 |

FOREIGN PATENT DOCUMENTS

| | | |
|---|---|---|
| 0 828 224 A2 | 3/1998 | (EP) . |
| 2 761 837 | 4/1997 | (FR) . |
| 3-92441 | 4/1991 | (JP) . |
| 6-175828 | 6/1994 | (JP) . |
| WO97/34431 | 9/1997 | (WO) . |

OTHER PUBLICATIONS

"Development of a New Platform for Car Navigation Systems" (published by Sumitomo Electric Industries, Ltd., No. 148, Mar. 1996, pp. 37–41).

Lee et al., Toward the Next Generation Public Traffic Information Systems Using Internet; IEEE, Apr. 28, 1997.

Meyers et al., Parameterized Types for Java; ACM, Jan. 15, 1997.

* cited by examiner

*Primary Examiner*—Gary Chin
(74) *Attorney, Agent, or Firm*—Finnegan, Henderson, Farabow, Garrett & Dunner, L.L.P.

(57) ABSTRACT

A basic navigation operating part implements basic navigating function, such as current position and route computation. Meanwhile, an extended program for extended navigating operation, typically used to present multimedia information, is described in a general-purpose language such as Java. A virtual machine interprets and executes this extended program. If a navigation control code related to the basic navigating function is generated during the execution of the extended program, the service module 64 translates it into a format interpretable by the basic navigation operating part. Thus, several Java-compatible multimedia facilities can be linked with the basic navigating function. Navigation system platforms can execute a chain of basic and extended navigating operations without being provided with a platform-specific program for extended navigating operation.

13 Claims, 5 Drawing Sheets

| | |
|---|---|
| PRIMARY FUNCTION LEVEL | Acquiring the vehicle position |
| | Acquiring the vehicle orientation |
| | Acquiring the altitude at which the vehicle is moving now |
| | Acquiring the cursor position |
| | Coordinate transformation |
| | Acquiring a registered point |
| | Setting up a registered point |
| | Acquiring a destination point |
| | Setting up a destination point |
| | Acquiring a point through which the vehicle is traveling |
| | Setting up a point through which the vehicle is traveling |
| | Acquiring route computing parameters |
| | Setting up route computing parameters |
| | Route computation |
| | Map display |
| | Acquiring route data resulting from computation |
| | Acquiring information about crossings |
| | Acquiring expected arrival time |
| | Expected arrival time computation |
| | Acquiring expected time at which the vehicle is passing through the registered point |
| | Computation of expected time at which the vehicle is passing through the registered point |
| COMPOSITE FUNCTION LEVEL | Point Retrieval |
| VICS RELATED (Vehicle Information and Communication System) | Acquiring data on the current position |
| | Acquiring data on the network to which the system is connected |
| | Acquiring emergency message data |
| | Acquiring caution and warning information |
| | Acquiring message data |
| | Acquiring data on simplified graphics 1 |
| | Acquiring data on simplified graphics 2 |
| | Acquiring parking lot information |
| | Acquiring information for event restraint via a link |
| | Acquiring fault information |
| | Acquiring sectional travel lap time data |
| | Acquiring information for center and network fault notification |
| | Acquiring information for traffic congestion via a link |
| | Acquiring information for travel time during traffic congestion via a link |
| | Acquiring information for travel speed via a link |
| | Acquiring lane report information |
| | Acquiring DRGS response information |

FUNCTIONS OF TYPICAL CONTROL CODES TO BE TRANSLATED BY THE TRANSLATING SERVICE FUNCTION

Fig. 5

NAVIGATION SYSTEM AND NAVIGATION DATA PROCESSING METHOD

BACKGROUND OF THE INVENTION

1. Field of the Invention

The present invention relates to navigation systems, particularly a navigation system which is adaptive to extended navigation facilities, such as the presentation of multimedia information available for moving bodies.

2. Description of the Related Art

Navigation systems have now become a well-known automobile accessories for informing a driver of the current vehicle position and guiding the driver to a specific destination via an appropriate route. For example, a typical navigation system may sense the current position of the vehicle using a current position sensor, retrieve a map in the vicinity of the current position from the map database, and then displays the retrieved map on which the current position is marked. When the user selects a destination, such a navigation system may compute a suitable route to the destination and guide the operator (driver) to the destination, based on the computed route. The set route is typically shown on the display and voice announcements, such as "turn right" or "turn left" are output from a speaker as required.

FIG. 1 shows the basic configuration of an example predecessor navigation system. Navigation hardware 1 (FIG. 1) includes the CPU and other components of a navigation computer, current position sensing and related devices, a map data recording medium, and input/output devices. The applied hardware configuration varies according to the system specification. A device driver 2 (FIG. 1) controls the navigation hardware 1. Navigation programs 4 which implement various kinds of navigation actions are executed under a navigation operating system (OS) 3. The navigation programs include a current position computing program, a route computing program, and a map retrieval program. A navigation system according to this type of configuration is described in, for example, "Development of a New Platform for Car Navigation Systems" (published by Sumitomo Electric Industries, Ltd., No.148, March, 1996, pp. 37–41).

Meanwhile, the development of a more advanced navigation system provided with extended navigating facilities for expanding applications in addition to the above-mentioned basic navigation features is under way. Such system attracts attention as one variant of an Intelligent Transport Systems (ITS). One extended navigating facility is presentation to the user of recommendation information. For example, concerning a public space such as a restaurant is presented as one candidate destination, with multimedia visual and audio information being included in such a presentation. It is desirable that such extended navigating and previously established basic navigating operations be combined and executed in a chain. This kind of navigation system is expected to be compatible with multimedia and networking technologies, providing the user with the versatility of information through the operation in conjunction with telecommunicating infrastructure, such as centers.

In the predecessor navigation system as shown in FIG. 1, however, the navigation programs 4 are platform-dependent, that is, they are specific to a proprietary machine model (the platform refers to the navigation hardware 1 or the combination of the hardware 1 with the navigation OS 3). To implement a chain of basic and extended navigating operations as mentioned above, thus, a discrete extended navigation program which is adaptive to each specific platform model must be prepared. The work load for preparing such a program is high and requires great efforts and time. In situations where customizing on a platform-by-platform basis is required, a car-oriented information system, which distributes such information to many cars from a telecommunicating infrastructure, will become very complex.

As a referential technical approach, ISO-TC204 suggests accessing a map database using Java. However, this suggestion discusses that Java is incorporated into a part of the basic navigating operation, but does not concern the extended operation of navigation.

SUMMARY OF THE INVENTION

An object of the invention is to provide a navigation system which can suitably perform a chain of basic and extended navigating operations, without equipping each navigating platform with a program dedicated to extended facilities.

A navigation system implemented by the invention generates and outputs the navigating information for guiding a moving body to a specific place. This system comprises a basic navigation operating function which implements basic navigating operation, an extended program interpreting and executing function which interprets and executes an extended program for implementing extended navigating operation described in a given general-purpose language, and a translating service function which translates a specific general-purpose language into a format interpretable by the basic navigation operating function.

The translating service function includes service units which are respectively associated with navigation control data items. For a navigation control data item related to the basic navigating operation generated during the execution of an extended program, the service unit appropriate to this navigation control data item translates the data item into a format interpretable by the basic navigation operating function. The translated data is then delivered to the basic navigation operating function.

As described above, when the navigation system according to the invention executes extended navigating operation, such as the presentation of multimedia information, the extended program interpreting and executing function interprets and executes an extended program for implementing extended navigating operation described in a general-purpose language. A noticeable feature of this invention is the provision of the translating service function. Because the translating service function translates the navigation control data into a format interpretable by the basic navigation operating function, the basic navigation operating function and the extended program that implements extended navigating facilities can coordinate appropriately. This allows a common extended program to run on the different platform types used for discrete navigation systems. Every navigation system can use a common extended program and chain the extended facilities provided by the extended program with its basic operation. There is thus no need for preparing a platform-specific extended program. Distributing a common extended program to a plurality of platform types is all that is required, making it possible to design and construct a simplified information system intended for moving bodies.

The above-mentioned given general-purpose language is a language interpretable to a plurality of different types of navigating platforms, for example, Java. If Java is used, a Java virtual machine undertakes the function of interpreting and executing an extended program.

It may also be preferable that the navigation system according to the invention includes an addition and modification control function. When an item is added to the basic navigation operating function or the existing basic functional item is modified, the addition and modification control function adds a service unit to the translating service function or modifies the corresponding service unit. When the navigation system is provided with this function, addition or modification made to the basic navigation operating function would be reflected in the translating service function. Thus, the navigation system can easily coordinate between the added or modified part of its basic navigation operating function and the extended program execution. In other words, the entire system can easily be altered to enhance the basic navigation operating function.

It may also be preferable that the translating service function includes a navigation class library, a navigation Application Programming Interface (API) that interfaces the basic navigation operating function with the navigation class library, and an extended API that interfaces the extended program with the navigation class library.

Furthermore, it may also be preferable that the basic navigation operating function has a rapid processing capability for, at least, current position computation, route computation, map retrieval, map display, and visual route instructions with voice announcement, while the extended program implements navigation-related services other than executed by the basic navigation operating function. Computing the current position and a route, retrieving and displaying the map, and route instructions are covered by the basic function of a navigation system and thus are strongly required to be processed at a high rate. When such a rapid processing capability is available, the basic navigation operating function can rapidly execute the processing of these basic functional items without calling on the extended program interpreting and executing function. On the other hand, additional multimedia processing is executed by the extended program interpreting and executing function. Consequently, the extension of the navigation function can easily be achieved, while the rapid processing ability of the basic navigation operating function is maintained.

BRIEF DESCRIPTION OF THE DRAWINGS

FIG. 5 lists sample control codes transferred between the multimedia function and the basic navigation operating function of the system shown in FIG. 2.

DESCRIPTION OF THE PREFERRED EMBODIMENT

Figure 1:
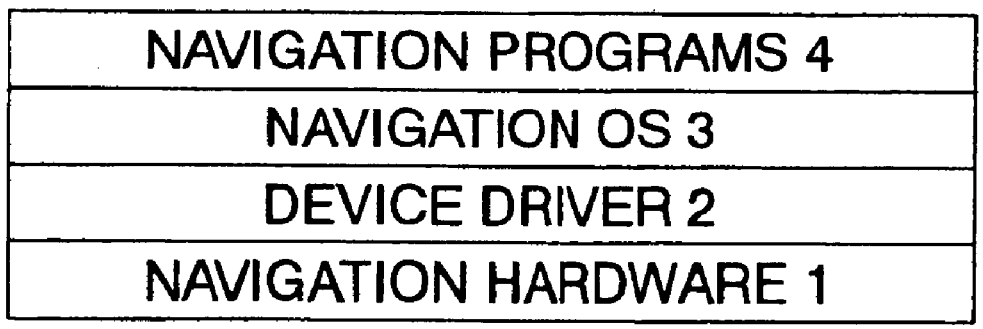
FIG. 1 is a schematic representation of the configuration of an example predecessor navigation system.
Figure 2:
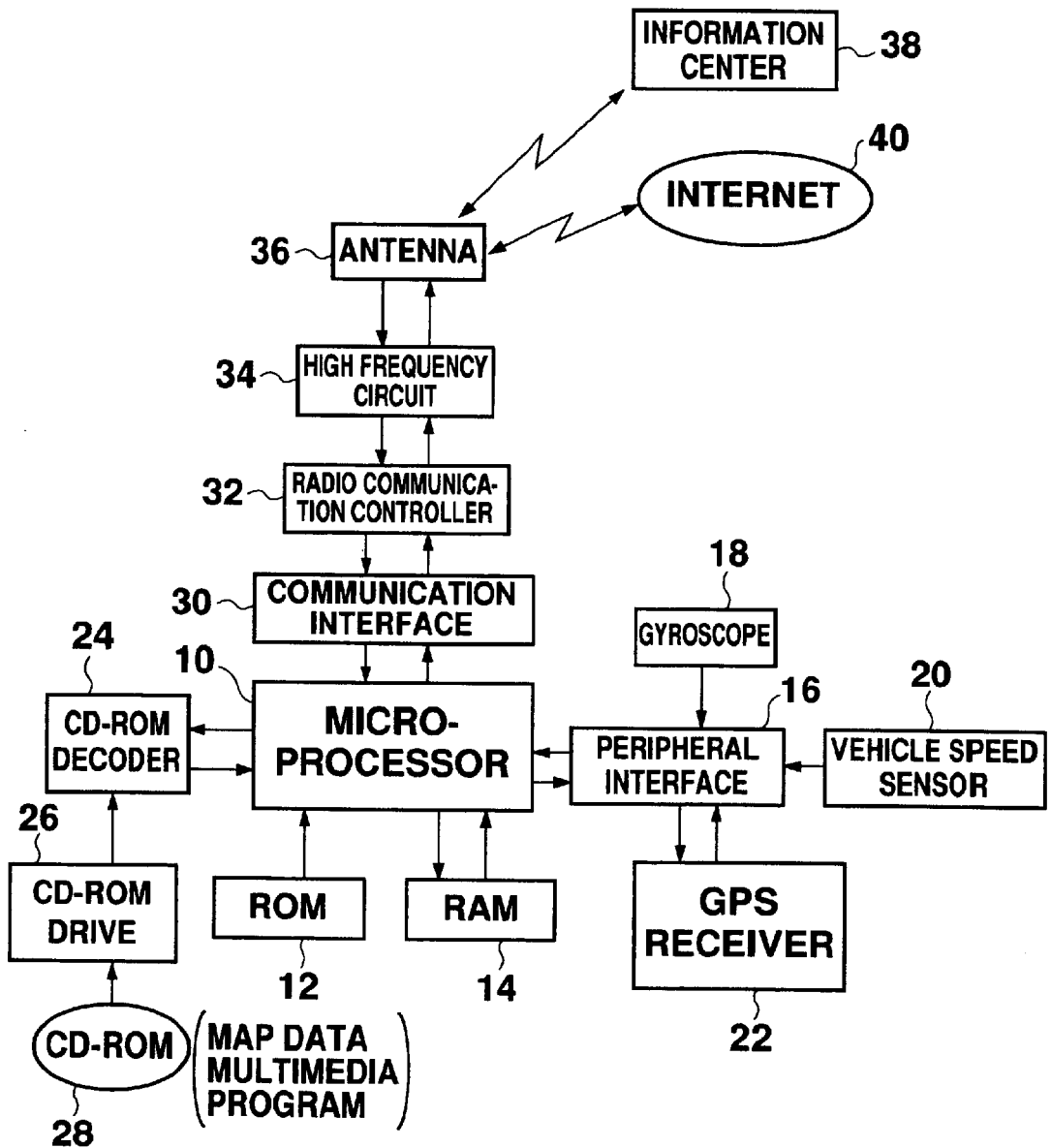
FIG. 2 is a block diagram showing the navigation system according to a preferred embodiment of the invention.

A preferred embodiment of the present invention will be described with reference to the attached drawings. FIG. 2 is a block diagram showing the entire configuration of a car navigation system according to the preferred embodiment of the present invention. A microprocessor 10 connects with a ROM 12 and a RAM 14, controls the entire system, and generates navigation information by executing navigation-related programs. The microprocessor 10 also connects with a gyroscope 18, a vehicle speed sensor 20, and a receiver of global positioning system (GPS) 22 via a peripheral interface 16. The microprocessor computes the vehicle status, including its current position and moving direction, based on signals input from the above elements. The microprocessor 10 also connects with a CD-ROM drive 26 via a CD-ROM decoder 24 and reads the map and program data stored in a CD-ROM 28 inserted into the slot of the CD-ROM drive 26. As communication means, a communication interface 20, a radio communication controller 32, a high frequency circuit 34, and an antenna 36 are provided. Using these components, the navigation system communicates with an information center 38 and the internet 40 which are available as telecommunications infrastructure. To communicate with the information center 38, telephone circuits, bidirectional radio communication, FM multicasting, radio wave beacons, optical beacons, satellite broadcasting, etc. are used as appropriate. The data (including a program) acquired by communication is appropriately stored into the RAM 14 and a hard disk (not shown). In addition, a switch and a microphone are provided as input means and a display and a speaker as output means, although neither is shown.

The navigation system according to this embodiment and consisting of the above elements, displays a road map and marks the location of a site (such as a restaurant as public facility information) after communication with the telecommunications infrastructure. The navigation system also computes a most reasonable route to a specific destination and informs the user of the route by displaying and announcing the way, and moreover, outputs driving cautions or guidance through the ITS.

Figure 3:
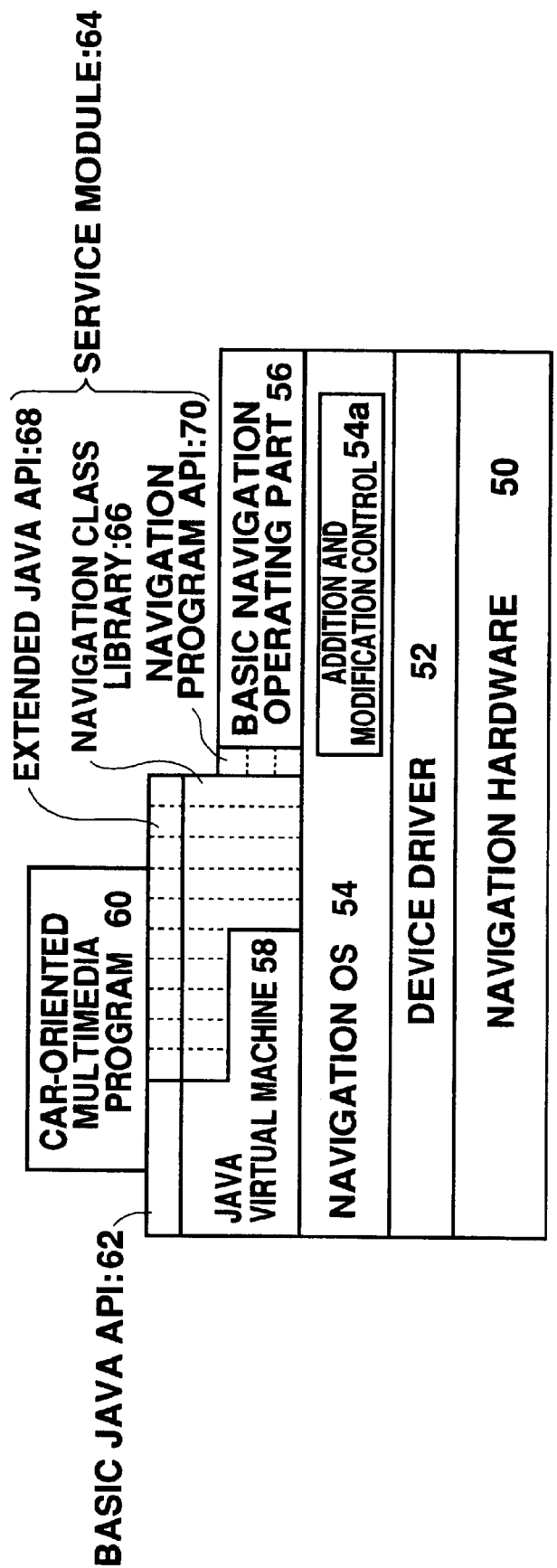
FIG. 3 is a shematic representation of the configuration of the system shown in FIG. 2.

FIG. 3 is a shematic representation of the navigation system configuration. Navigation hardware 50 includes the components shown in FIG. 2 and a device driver 52 for control. A basic navigation operating part 56 is positioned over a navigation OS part 54. The basic navigation operating part 56 executes computing the current position and a route, retrieving a map, and other processing as does the corresponding part of the predecessor navigation system. Because such processing must be even faster, it is suitable to use processing programs described in a specific language dedicated to a discrete platform model in order to achieve rapid processing, as is the case in this embodiment. The basic navigation operating part 56 accomplishes this function by running basic navigation programs written into the ROM12 (FIG. 2) and the CD-ROM 28 (FIG. 2), for example.

As shown in FIG. 3, this system is equipped with a Java virtual machine 58. The Java virtual machine 58 interprets and executes a car-oriented multimedia program 60 described in a general-purpose Java language. A basic Java Application Programming Interface (API) 62 intervenes between the Java virtual machine 58 and the car-oriented multimedia program 60. The car-oriented multimedia program is equivalent to an extended program applied to this invention. The program may be either loaded from the CD-ROM 28 or acquired (downloaded) from the telecommunications infrastructure to be assembled into this system.

As is well known, Java programs run independent of the platform including hardware and OS, and can be run on a plurality of .different platforms. The user can run the above-mentioned multimedia program on any type of platform by installing the Java virtual machine 58 in that platform. In other words, a plurality of different types of platforms can use the common car-oriented multimedia program.

The car-oriented multimedia program 60 and the basic navigation operating part 56 are interlinked and coordinate via a service module 64. The service module 64 (for basic navigation operation and status data acquisition) includes a navigation class library 66, an extended Java API 68, and a navigation program API 70. The extended Java API 68 intervenes between the library 66 and the program 60. The navigation program API 70 intervenes between the library 66 and the basic operating part 56. The left half of the service module 64 is assigned to handle byte codes supplied to the Java virtual machine 58 and its right half is assigned to handle CPU native codes.

When a control code is encountered during the execution of the above-mentioned multimedia program, if it is an extended API code for navigation (referred to as a navigation control code as in this invention), it is manipulated by the service module 64. In the service module 64, a plurality of service units are predefined and provided, each of which corresponds to each extended API code for navigation. Each service unit includes a class library unit and the APIs on both sides. The service unit translates the appropriate extended navigation API code into a format interpretable by the basic navigation operating part 56. The basic navigation operating part 56 operates in accordance with the translated control code.

Next, the behavior of the navigation system according to the embodiment of the invention will be described. As an example case of the car-oriented multimedia program, the program is assumed to present information for a public facility such as a restaurant. If several restaurant presentation programs are stored in the CD-ROM 28 (FIG. 2), when the user selects one restaurant from the menu display, the presentation program for that restaurant is loaded into the system. In another case where the menu information for restaurant selection is received from an information center 38 (FIG. 2) via a communication circuit and shown on the display, when the user selects a restaurant, the corresponding restaurant code is transmitted to the information center 38. Then, the selected restaurant presentation program is sent back from the information center 38 and loaded into the system.

The above restaurant presentation program, which is described in Java as noted above, is interpreted and executed by the Java virtual machine 58 (FIG. 3). The restaurant location, menu, prices, hours of operation, inside appearance, and other features of the restaurant are presented through the use of visual and audio multimedia functions. For example, a virtual waitress may introduce the inside of the restaurant on the display screen.

Figure 4:
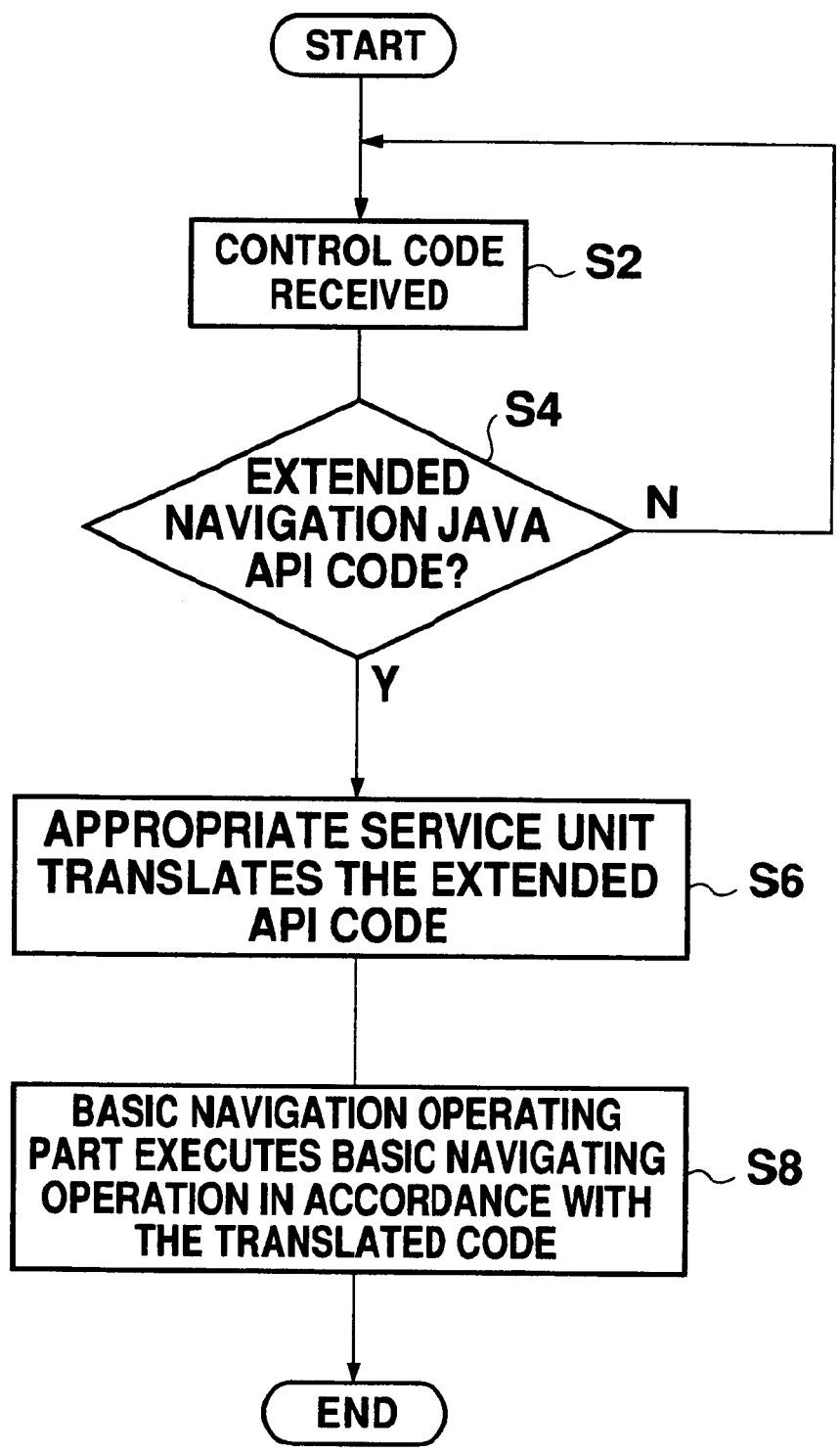
FIG. 4 is a flowchart describing the operation of the system shown in FIG. 2.

If another extended navigation API code that is related to the basic navigation is generated during such presentation program execution, the code is treated in the following procedure. FIG. 4 shows a flowchart that outlines this procedure. When the navigation system receives a control code generated during a presentation program (S2), it determines whether the code is an extended API code for navigation (S4). If the code is not extended API (it is a basic Java API code), the execution returns to S2. If the code is extended API (YES for S4), the corresponding service unit in the service module 64 translates the extended API code for navigation into an appropriate format (S6). The translated code is then delivered to the basic navigation operating part 56 and basic navigation is executed in accordance with the code (58).

As an example wherein the navigation system executes the processing to present the positional relationship between the current position and the restaurant to the user, the navigation system generates an API code intended for map display for the current position. This code includes the following assigned settings: (a) the positional relationship between the current position and the area required to be displayed, (b) map display orientation (up=north or up=heading up), (c) map scaling, (d) a three-dimensional display parameter, (e) coloring specification to classify the information on the display, and (f) a map data file location computing parameter. For example, the setting of item (a) determines how the data is displayed by specifying whether the current position will be the restaurant position will be displayed in the center of the screen.

These assigned settings are separated from the API code for displaying the map for the current position. The service module 64 translates the assigned settings into the format interpretable by the basic navigation operating part 56. The basic navigation operating part 56 displays a map wherein the current position and the restaurant position are marked, based on the assigned settings. To do this, the basic navigation operating part 56 executes processing as follows: computes the current position; computes the car moving direction if the map display orientation setting is heading up; and accesses the map data address and reads the map data with the specified scaling from the CD-ROM. The map data may be downloaded from an telecommunicating infrastructure. Furthermore, the basic navigation operating part 56 executes the computation for three-dimensional coordinate transformation, based on the three-dimensional display parameter and transfers the vector data to the graphics processing part. Along with the road map, peripheral traffic information may be displayed in a specified color, as appropriate. In this way, the navigation system allows the user to check the current position.

In a second example wherein a detailed map in the vicinity of the restaurant is displayed during the restaurant presentation, this processing is executed by user request. In this case, the navigation system generates an API code intended for map display targeting a specific point. As described above, similarly, the code includes the assigned settings: (g) the area required to be displayed (for example, a specific point is displayed in the center of the screen), (h) map scaling, (i) a three-dimensional display parameter, (j) coloring specification to classify the information on the display, and (k) a map data file location computing parameter. These assigned settings are separated from the API code that is for displaying the specific point targeting map. The service module 64 translates the assigned settings into the format interpretable by the basic navigation operating part 56. Then, the basic navigation operating part 56 displays the map in the vicinity of the restaurant, based on the assigned settings, the processing being the same as described above for the first example.

In a third example, a route to the restaurant is set and the navigation system guides the user to the restaurant. When the user wishes to go to the restaurant presented by the system and requests guidance to the restaurant via input means, the navigation system generates an API code with the destination specified. This code includes the positional coordinates of the moving destination (i.e., the restaurant) as one of the assigned settings. The service module 64 translates the positional coordinates into a format interpretable by the basic navigation operating part 56. The basic navigation operating part 56 then computes a reasonable route from the current position to the destination. A well-known method such as Dijkstra method may be used for route computation. The route guiding based on the computation is carried out via the display and the speaker. The guiding involves a map display including divergent points and voice announcement such as "turn right" or "turn left."

Sometimes, a functional item may be added to the basic navigation operating part 56 in FIG. 3 or the existing functional item in this part may be modified, so that the basic navigation function can be enhanced. In the present invention, the navigation system is equipped with an addition and modification control 54*a*, which is a feature of the invention, as shown in FIG. 3. If addition or modification is made to the basic operating part 56, the addition and modification control 54*a* adds a service unit to the service module 64 or modifies the existing service unit in the module in accordance with the addition or the modification. The service module is thus appropriately subjected to transformation, such as expansion. Through such addition or modification processing, the navigation system according to this embodiment can rapidly and easily coordinate between the new function of the basic navigation operating part 56 and the function of the car-oriented multimedia program.

The present invention, when embodied as described above, assures that the basic navigating function of the predecessor system is implemented by the basic navigation operating part 56 of the system and that route computation and other processing are thus rapidly executed. On the other hand, multimedia information presentation, one of the extended operations of the navigation system according to the present invention, is implemented by a multimedia program described in Java and the Java virtual machine 58. The service module 64, incorporated into the invented system embodiment, links the multimedia function and the basic navigating function. The present invention therefore enables a common multimedia program to run on different navigation system platforms. Consequently, every navigation platform can use this common program and appropriately perform continuous and smooth navigation processing by combining the multimedia function implemented by the common program and its basic operating function. Because of no necessity of preparing a platform-specific extended program which must be customized to be adaptive to the basic navigation function, a significant amount of labor and time required for applying the extended facilities to the navigation system can be saved.

A car-oriented information system provides networking of many cars and elements of the telecommunications infrastructure via telecommunication means. In individual cars, different types of hardware may be mounted, but the present invention enables the telecommunications infrastructure to distribute only one, common, car-oriented multimedia program to the cars. Because the telecommunicating infrastructure need not transmit different types of car-oriented multimedia programs to different cars, a simplifieds car-oriented information system can be constructed.

As far as the above-mentioned embodiment description is concerned, the service module 64 (FIG. 3) translates the control code generated during the execution of the car-oriented multimedia program 60 into the appropriate format code and delivers this code to the basic navigation operating part 56. Conversely, the code generated in the basic navigation operating part 56 may be translated and delivered via the service module 64 to the multimedia function part. For example, the current position is computed by the basic navigation operating part 56 and delivered to the. multimedia function part. On receiving this data, the multimedia function displays various types of public places, such as a restaurant, bookstore, or gas station in the periphery of the current position on the map. Furthermore, it is also suitable that the navigation system be arranged in order to operate as follows. After the multimedia function part sends the control code to the basic operating part 56 via the service model 64, the basic operating part 56 executes basic operation (such as current position and/or route computation) according to the control code and returns the result to the multimedia function part via the service module 64. FIG. 5 lists the typical control data items that are considered appropriate data to be transferred between the car-oriented multimedia function part and the basic navigation operating part.

In the embodiment mode discussed above, the present invention is assumed to be applied to the car navigation system. However, the invention may be applied to types of navigation systems. For example, the invention can also be applied to a portable navigation system.

What is claimed is:

1. A navigation system that generates and outputs the navigating information for guiding a moving body comprising:

a basic navigation operating means for implementing basic navigating operation;

an extended program interpreting and executing means for interpreting and executing an extended program for extended navigating operation described in a given general-purpose language; and a translating service means for translating said general-purpose language into a format interpretable by said basic navigation operating means, wherein, when navigation control data related to said basic navigating operating is generated during the execution of said extended program, a service unit which is included in said translating service means and is appropriate to said navigation control data translates said navigation control data into said format and delivers the translated navigation control data to said basic navigation operating means; and further including an addition and modification control means which adds a second service unit to said translating service means or modifies the service unit included in said translating service means in accordance with the addition or modification which has been made to said basic navigation operating means.

2. The navigation system according to claim 1, wherein said translating service means includes a navigation class library, a navigation Application Programming Interface (API) which interfaces the basic navigation operating means with said navigation class library, and an extended API which interfaces the extended program with said navigation class library.

3. The navigation system according to claim 1, wherein said basic navigation operating means has a rapid processing capability for, at least, current position computation, route computation, map retrieval, map display, and route instructions, while said extended program implements navigation-related services other than executed by said basic navigation operating means.

4. The navigation system according to claim 1, wherein said system includes navigation hardware, a device driver, and a navigation operating system (OS), and said basic navigation operating means and said extended program interpreting and executing means are positioned in a layer above said navigation OS.

5. The navigation system according to claim 1, wherein said general-purpose language is Java and said extended program interpreting and executing means is undertaken by a Java virtual machine.

6. The navigation system according to claim 5, wherein said extended program is a car-oriented multimedia program described in Java.

7. The navigation system according to claim 6, wherein said navigation control data is an extended navigation API code generated during the execution of said car-oriented multimedia program running on the Java virtual machine and said code is manipulated by said translating service means and then delivered to said basic navigation operating means.

8. The navigation system according to claim 7, wherein said extended navigation API code is intended for current position display.

9. The navigation system according to claim 7, wherein said extended navigation API code is intended for map display targeting a specific point.

10. The navigation system according to claim 7, wherein said extended navigation API code is one with a destination specified.

11. The navigation system according to claim 1, including a communication device for receiving said extended program from an external source.

12. The navigation system according to claim 1, wherein said basic navigation operating means executes said basic navigating operation in accordance with the navigation control code supplied from said translating service means and the result of said basic navigating operation is returned to said extended program via said translating service means.

13. A navigation data processing method for generating and outputting the navigating information for guiding a moving body comprising:

a step of performing basic navigating operation through the use of a basic navigation operating means;

a step of interpreting and executing an extended program for extended navigating operation described in a given general-purpose language;

a step of translating navigation control data by a translating service means into a format interpretable by the basic navigation operating means provided said data is related to said basic navigating operation and generated during the execution of said extended program; and a step of providing an addition and modification control means which adds a second service unit to said translating service means or modifies the service unit included in said translating service means in accordance with the addition or modification which has been made to said basic navigation operating means.

* * * * *